(12) United States Patent
Pierce et al.

(10) Patent No.: US 7,937,543 B2
(45) Date of Patent: May 3, 2011

(54) DETERMINATION OF THE FRAME AGE IN A LARGE REAL STORAGE ENVIRONMENT

(75) Inventors: Bernard R Pierce, Poughkeepsie, NY (US); Elpida Tzortzatos, Lagrangeville, NY (US); Dieter Wellerdiek, Ammerbuch (DE)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 11/857,513

(22) Filed: Sep. 19, 2007

(65) Prior Publication Data

US 2008/0077764 A1 Mar. 27, 2008

(30) Foreign Application Priority Data

Sep. 22, 2006 (EP) .................................... 06121102

(51) Int. Cl.
*G06F 12/00* (2006.01)
(52) U.S. Cl. ........ 711/159; 711/133; 711/136; 711/154; 711/160; 711/170
(58) Field of Classification Search .................. None
See application file for complete search history.

(56) References Cited

U.S. PATENT DOCUMENTS

2006/0129780 A1* 6/2006 Dunshea et al. .............. 711/170
* cited by examiner

*Primary Examiner* — Kevin L Ellis
*Assistant Examiner* — Alan Otto
(74) *Attorney, Agent, or Firm* — Cantor Colburn LLP; William Kimmaman

(57) ABSTRACT

A method for automatically determining performance problems in a computer system due to a metric indicating a current memory peak load in the computer system is disclosed. In order to decrease CPU consumption in large memories it is proposed to perform the steps of:
a) using a cyclic stealing algorithm used in prior art for stealing subunits, if the subunits were not referenced since the last cycle and writing the subunits to a secondary memory device, with an extension for determining the age of memory subunits, wherein the extension comprises the steps of:
b) writing time stamps for a subselection of the memory subunits to a data storage always when the stealing routine has processed a subselection, wherein the current time of a current cycle and the preceding current time of a preceding cycle are stored in respective entries of the data storage, for generating age information for the memory subunits,
c) calculating the metric based on average age calculations including differences between a respective one of the current time and a respective one of the preceding current time of one or more of the table entries,
d) determining the occurrence of a peak load, when the metric is beyond a predetermined threshold level.

9 Claims, 9 Drawing Sheets

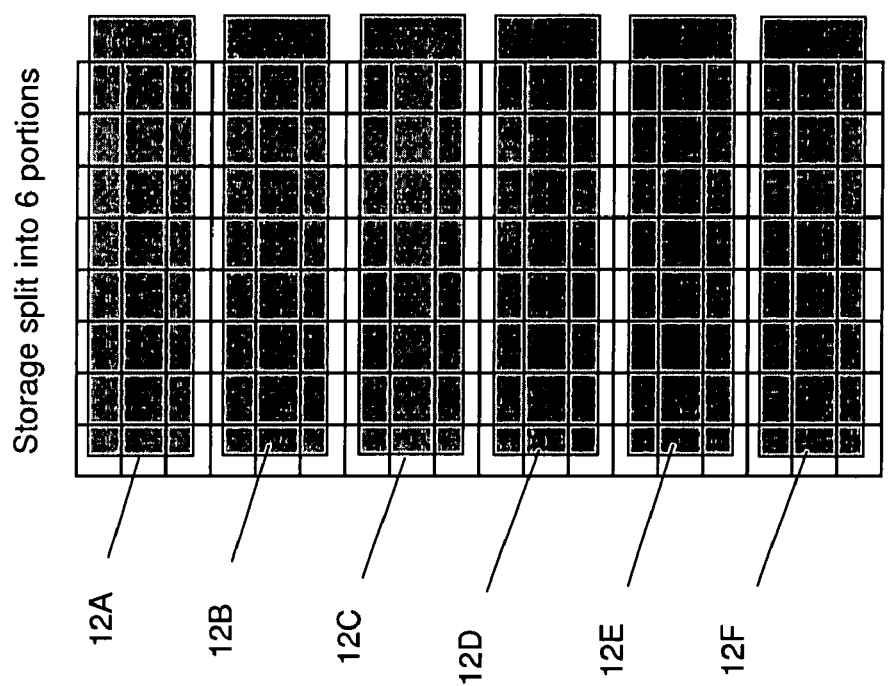

- The real storage gets split by a system defined constant into even logical pieces, i.e. portions (in the sample on the left the constant is 6)
  (portion size = total number of frames / System Constant)
- The minimum number of the system constant shouldn't be less than:
  System Constant = Number of previous portions + 2
- The maximum number of the system constant could be:
  System Constant = total number of frames
- Preferred: a System Constant of 16

FIG.5

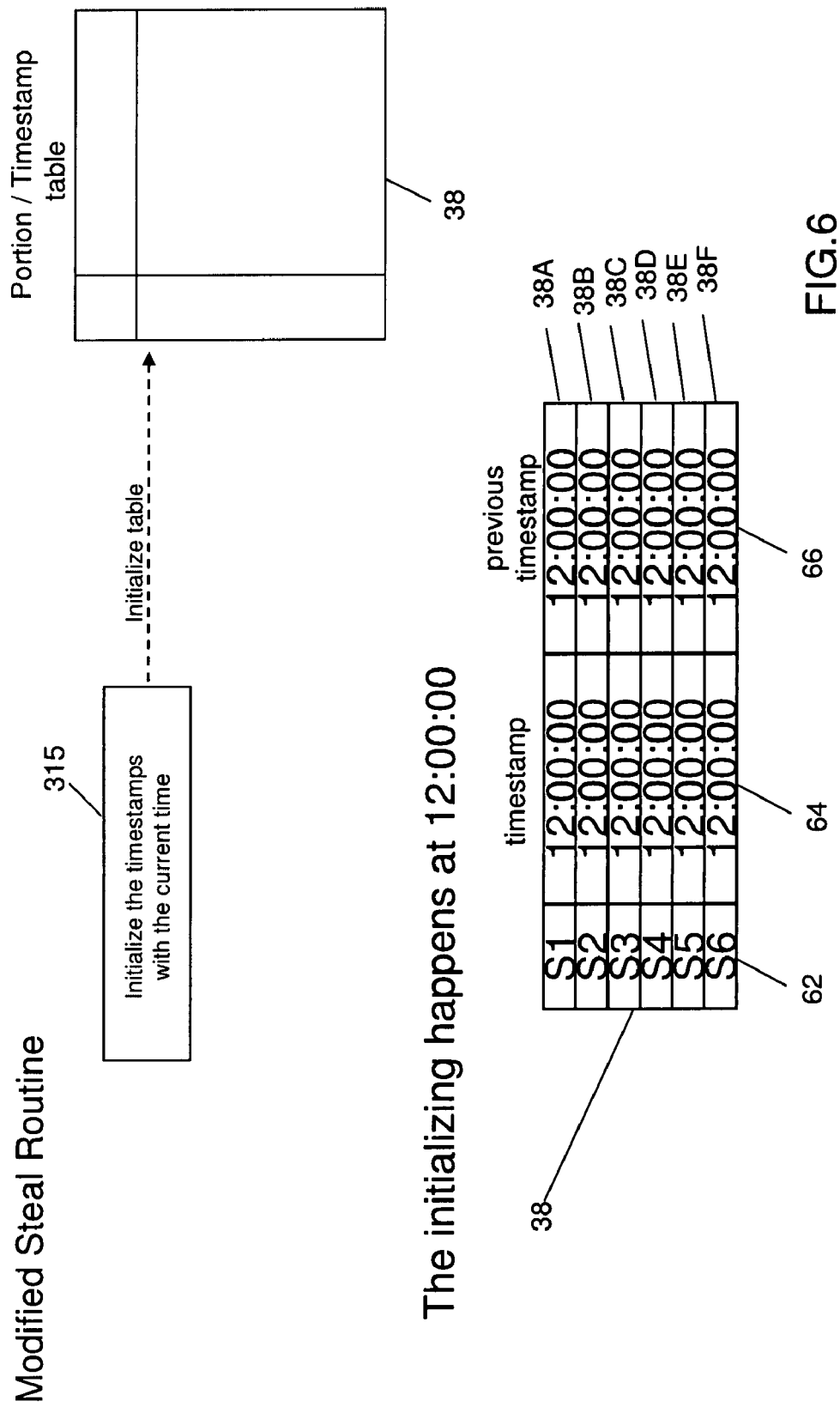

DETERMINATION OF THE FRAME AGE IN A LARGE REAL STORAGE ENVIRONMENT

CROSS-REFERENCE TO RELATED APPLICATION

This application claims the priority benefit under 35 U.S.C. §119 of European patent application 06121102.5, filed Sep. 22, 2006, and incorporated herein by reference.

BACKGROUND OF THE INVENTION

1. Field of the Invention

The present invention relates to the field of computer operating systems and in particular to managing their performance problems. More particularly, it relates to a method and system for automatically determining performance problems due to a metric indicating a current memory peak load in the computer system.

2. Description of the Related Art

In the current version of the IBM z/OS operating system, the hardware main memory is structured into memory frames. Each frame has 4096 bytes. The z/OS software splits the virtual memory into pages wherein each page has 4096 bytes. If a page is in use, i.e. it contains data, then the page is "backed" in a hardware frame or stolen and on a page device (slot). The relation between a page and a frame is done via the page frame table. The page frame table has an entry for each page, which contains page-related information, e.g. frame address, and page UIC ("unreferenced interval counts"). In this operating system, such above-mentioned metric is used based on a frame age determination in order to determine performance problems and to determine whether or not additional main memory storage should be used in order to get a better instruction processing having a better throughput through the central processing units (CPUs) interacting closely with the main memory.

FIG. 1 illustrates the most essential components used in this system:

The main memory 10 is shown to comprise a plurality of adjacent frames of which one is depicted with reference sign 14.

A timed "UIC update" process 20 runs every 10 seconds and calculates address space "unreferenced interval counts" (abbreviated herein as "UICs") for all address spaces. These address space UICs are then stored 28 in an address space frame age table 18.

The address space frame age table 18 gets then scanned (see arrow 31 by the "UIC update" process) for the highest address space UIC. The highest address space UIC value is then used (see step 30) as the "age" of the oldest frame.

A prior art stealing routine 16 employing a least recently used page replacement algorithm "steals" frames (see arrows 11) if the system has a need for new frames, but isn't required to calculate the age of the oldest frame. The stealing routine 16 actually uses (see arrow 26) the information of the oldest frame stored in the address space frame age table 18 to optimize the stealing.

In more detail, in the above-mentioned z/OS operating system implementation the before-mentioned metric is referred to as "system-high UIC". A prior art system routine 20 referred to as the "UIC update" process, runs every 10 seconds through all of the present memory pages, i.e. traverses the complete main memory by address spaces, and checks each page to determine whether the related frame has the reference bit set. If set, a UIC counter in the page frame table is reset to 0. If the reference bit is OFF, this UIC counter is increased, representing an increase of "frame age" of the frame. The highest counter of an address space-related frame is then stored as address space UIC in a table. After all memory pages have been processed like that, a "system-high UIC" value is set equal to the highest address space UIC value.

Disadvantageously, the calculation of the "single frame-based" UIC is a very time consuming process. The larger main memory is designed, the more frames must be tested for age determination. Thus, in the course of historical memory increase, the interval time for the "UIC update" run was already changed in the before-mentioned system from 1 second to 10 seconds in order to achieve a reasonable tradeoff between system performance usability and system performance overhead. Thus, disadvantageously, when the main memory is designed larger, which is a globally prevailing trend, there is a strong need for a new frame age determination consuming less CPU time in order to have a metric for determination of system performance problems.

SUMMARY OF THE INVENTION

An objective of the present invention is to provide an improved method for the determination of system performance problems based on the frame age determination, which consumes less CPU time.

This objective of the invention is achieved by the features recited in the accompanying independent claims. Further advantageous arrangements and embodiments of the invention are set forth in the respective subclaims. Reference should now be made to the appended claims.

In short, the method of the present invention calculates the above-mentioned metric, system-high UIC, by using the prior art "stealing routine" (clock page replacement algorithm) in a modified way, with an additional function for determining the age of a certain subselection of frames only, and using the information collected by this modified stealing routine (clock page replacement algorithm) in order to calculate an equivalent metric, equivalent to the prior art system-high UIC, wherein the system-high UIC is defined in relation to the cycle time needed to make a complete stealing cycle over the system page frame table, i.e. over all the frames existing in the system. Here, the following assumptions are made: When there is currently no stealing active, there are currently very old frames in the system and thus there are no performance problems. If stealing is used extensively, there are no old frames in the system, and thus the existence of a current performance problem can be determined. In the intermediate range of moderate stealing behavior, only a moderate memory load and moderate performance problems are determined according to the actual stealing frequency.

Thus, with reference to the appended claims a method and system for automatically determining performance problems in a computer system due to a metric, herein exemplarily referenced by system-high UIC, indicating a current memory peak load in the computer system is disclosed, which is characterized by the steps of:

a) using a cyclic stealing algorithm (clock page replacement algorithm) used in prior art for stealing subunits, if the subunits where not referenced since the last cycle, and writing the subunits to a secondary memory device, with an extension for determining the age of memory subunits, wherein the extension comprises the steps of:

b) writing time stamps for a subselection of the memory subunits to a data storage always when the stealing routine has processed a subselection, wherein the current time of a current cycle and the preceding current time of a preceding cycle are stored in respective entries of the data storage, for generating age information for the memory subunits;

c) calculating the metric based on average age calculations including differences between a respective one of the current time and a respective one of the preceding current time of one or more of the table entries; and d) determining the occurrence of a peak load, when the metric is beyond a predetermined threshold level.

A useful definition for the subselection is to divide the main memory into a number of e.g. 16 adjacent portions, and to select always one particular frame of a portion, e.g. the last one, for frame age determination.

By that a significant performance increase can be achieved with basically the same preciseness of performance problem determination.

The new frame age calculation has an overhead close to zero. In the prior art calculation of the frame age, calculation times of around 0.2 seconds on a 10 gigabyte (10 GB) system have been measured. Thus, a significant performance increase is achieved by the method of the invention.

Of course, instead of the last frame of a portion also a different subselection of frames can be applied. Examples are: the first, and the middle frame, or the frames 0/3, 1/3, 2/3 of portion extension, or other subdivisions of a memory portion.

BRIEF DESCRIPTION OF THE DRAWINGS

The present invention is illustrated by way of example and is not limited by the shape of the figures of the drawings, in which:

FIG. 5 is a schematic depiction of a preferred subdivision of the main memory, which is here shown to be split into 6 portions;

FIGS. 6-8 show the development of a timestamp table provided by the method of the present invention in order to store a current and a respective previous timestamp from the immediately preceding loop cycle, illustrating in each entry the frame age of the last frame in a portion, as depicted in FIG. 5.

DETAILED DESCRIPTION OF THE PREFERRED EMBODIMENT

Figure 2:
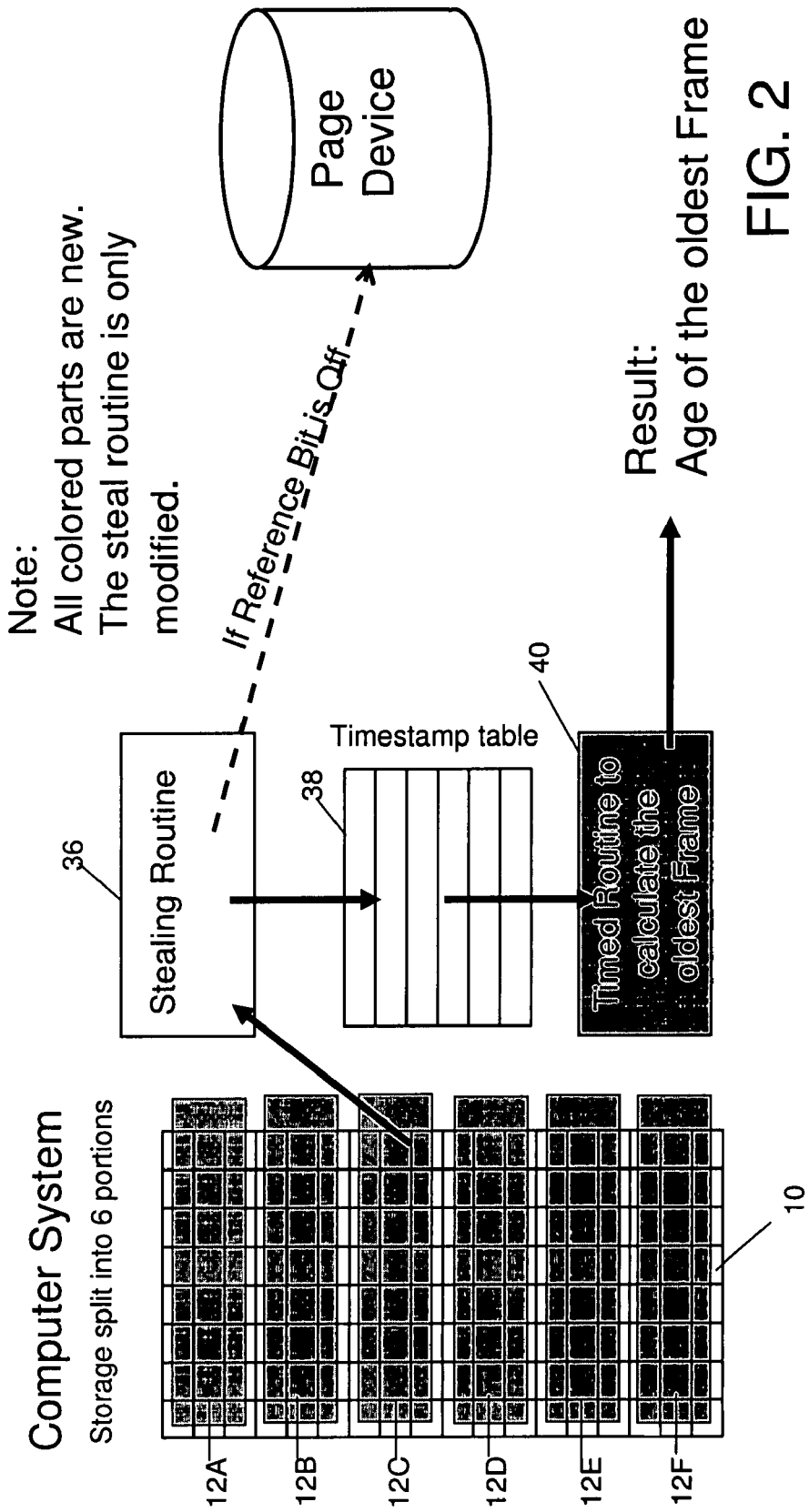
FIG. 2 illustrates the most basic structural components of an memory system environment used for a preferred embodiment of the present invention.

With further reference to FIGS. 2 and 5, the basic components used by the preferred embodiment of the method and system of the present invention are depicted.

The main memory 10 is logically subdivided by a system-defined constant into even logical subdivisions 12 (individually 12A-12F), referred to herein as memory portions. In this example this constant has a value of 6. The size of each portion 12 is thus preferably the same for each portion, wherein the total number of frames comprised by each portion is the total number of frames divided by this system constant. The minimum number of this constant should not be less than the number of "previous segments" (which is described in more detail further below), increased by 2. The maximum number of this system constant is delimited by the total number of frames. This of course is not a recommendable value.

Further, the prior art stealing routine (clock page replacement algorithm) is modified according to the invention and is denoted by a new reference sign 36.

A new timestamp table 38 is used having just one entry for each portion 12.

Further, a new timed routine 40 is used in order to calculate the oldest frame. Again the result is the age of the oldest frame, estimated according to the invention.

FIG. 5 shows basically the same number of portions 12. It should be mentioned, however, that also other ways of creating memory portions may be used. First, the number of portions 12 may be varied over a wide range as mentioned above, and second, the portions may also be defined to comprise subunits, like frames which are not adjacent areas in the memory. This renders the method a little bit more complicated, but the method remains useful.

Figure 3:
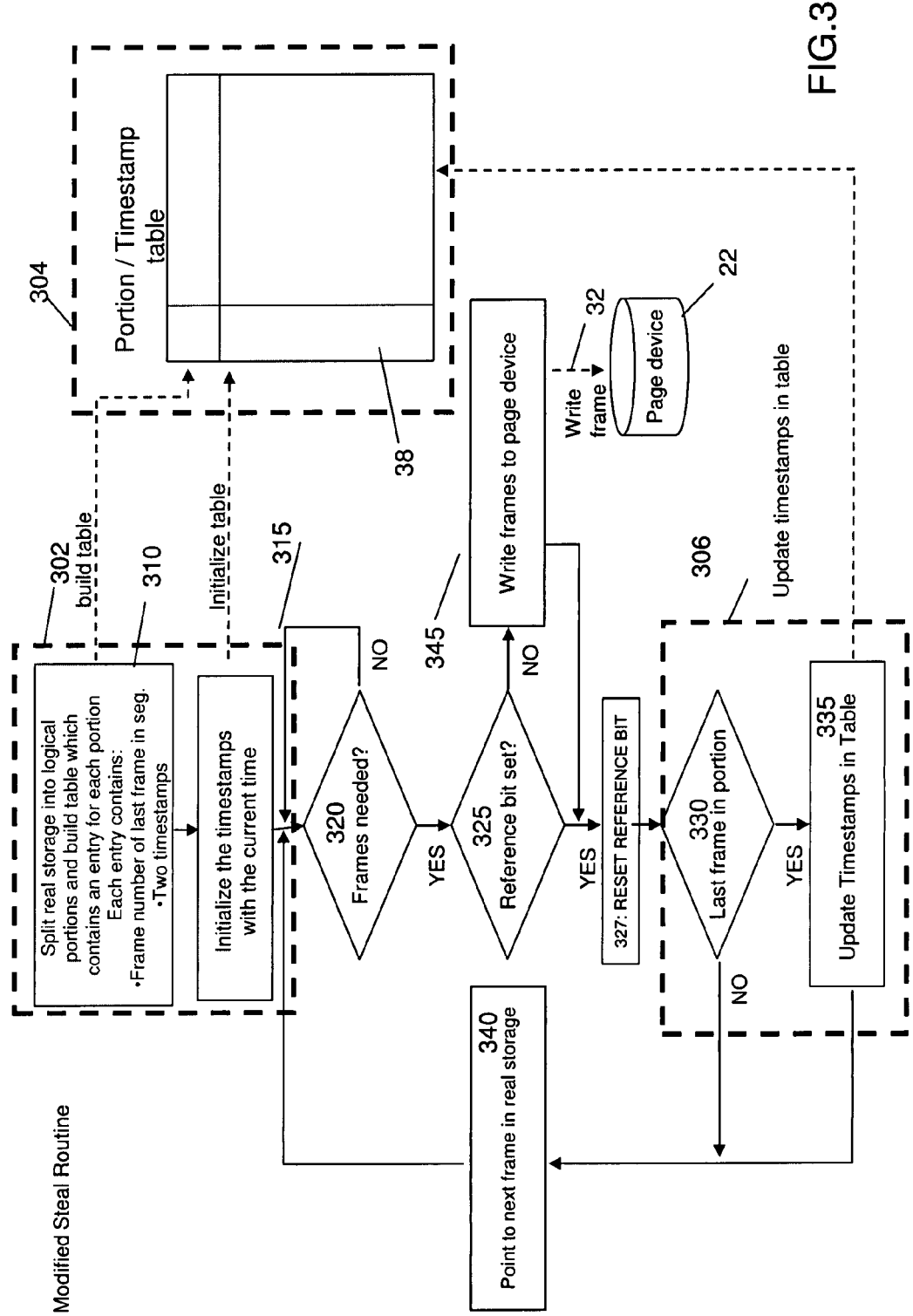
FIG. 3 illustrates the control flow of the most important steps of a preferred embodiment of the present invention in a modified stealing routine (clock page replacement algorithm)

With reference to FIG. 3, a control flow of the modified stealing routine (clock page replacement algorithm) of the present invention is described in more detail. Frames 302, 304 and 306 comprise new functions implemented by this preferred embodiment.

Figure 7:
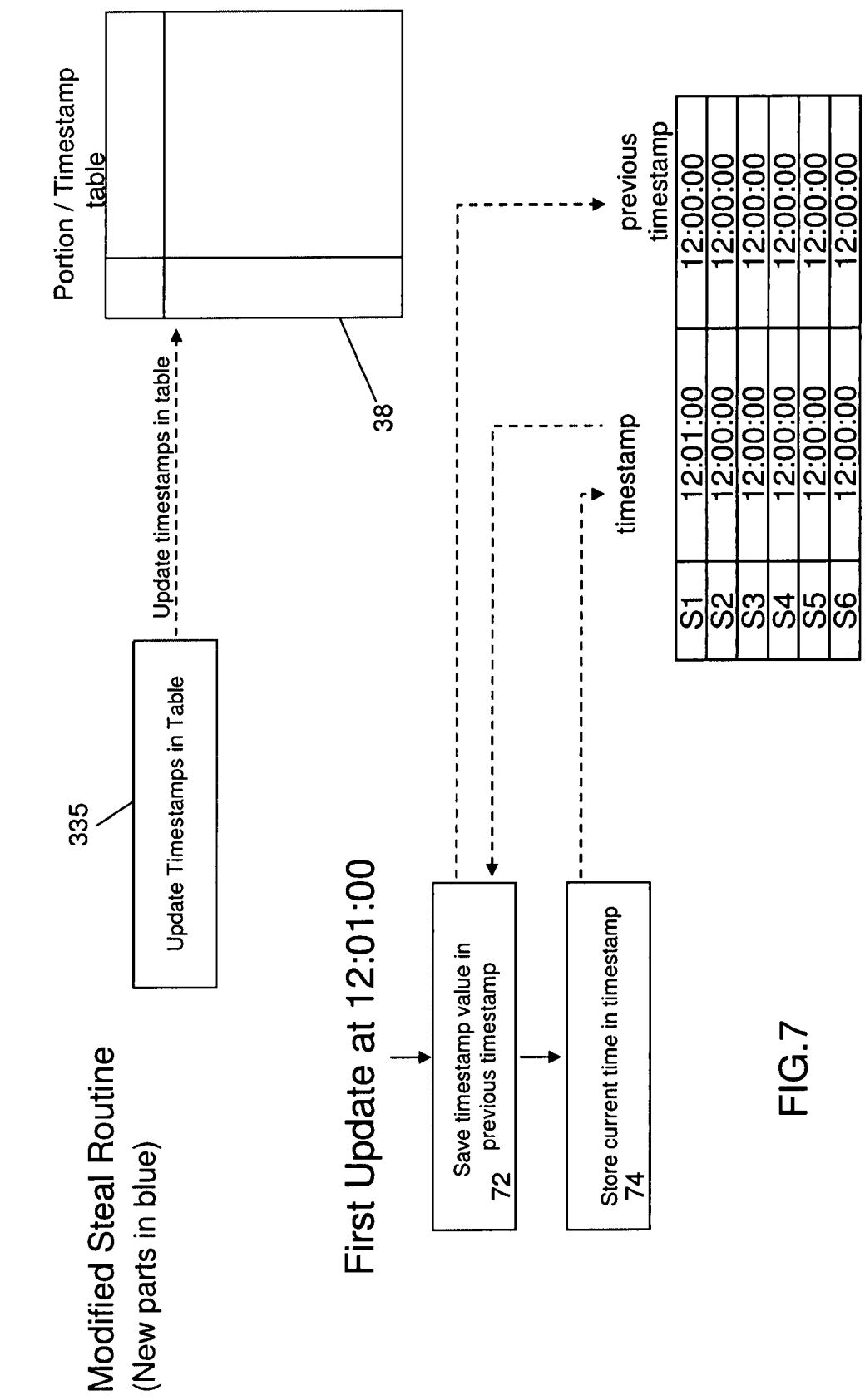

In more detail, in a first step 310 the main memory 10 is subdivided as mentioned before into a number (N) of logical portions 12. Then a table 38 is generated which contains one entry for each of the plurality of portions 12. Each table entry contains the frame number of the last frame in a respective memory portion 12 and two timestamp fields. This basic table entry structure is also depicted in FIG. 6, bottom part, FIG. 7, bottom part, and FIG. 8 in each of the blocks depicted there. It should be noted that the term "frame" or "memory frame" is used here to denote just a memory subunit. In other memory producers' terminology, of course, different expressions may be used.

In a next step 315 the timestamps are initialized with the current time. This is also depicted in FIG. 6, wherein for each timestamp table entry a particular time value, preferably the current time value, is stored. In this case the value is 12:00:00. Of course, this value can be extended to include more precise time information. Time information is read from a system timer device via respective time input lines, not depicted in order to increase clarity.

After initialization a loop is entered which is defined in prior art to comprise the complete memory, and in which loop the loop body is run through for each frame.

In this preferred embodiment the loop body is run through also for each frame, but an additional function is defined according to the invention which is highlighted by box 306, and in which an action is only performed when the last frame of a portion is encountered. Then, the same procedure is repeated for the next portion, and so on, until all memory portions have been processed.

Figure 1:
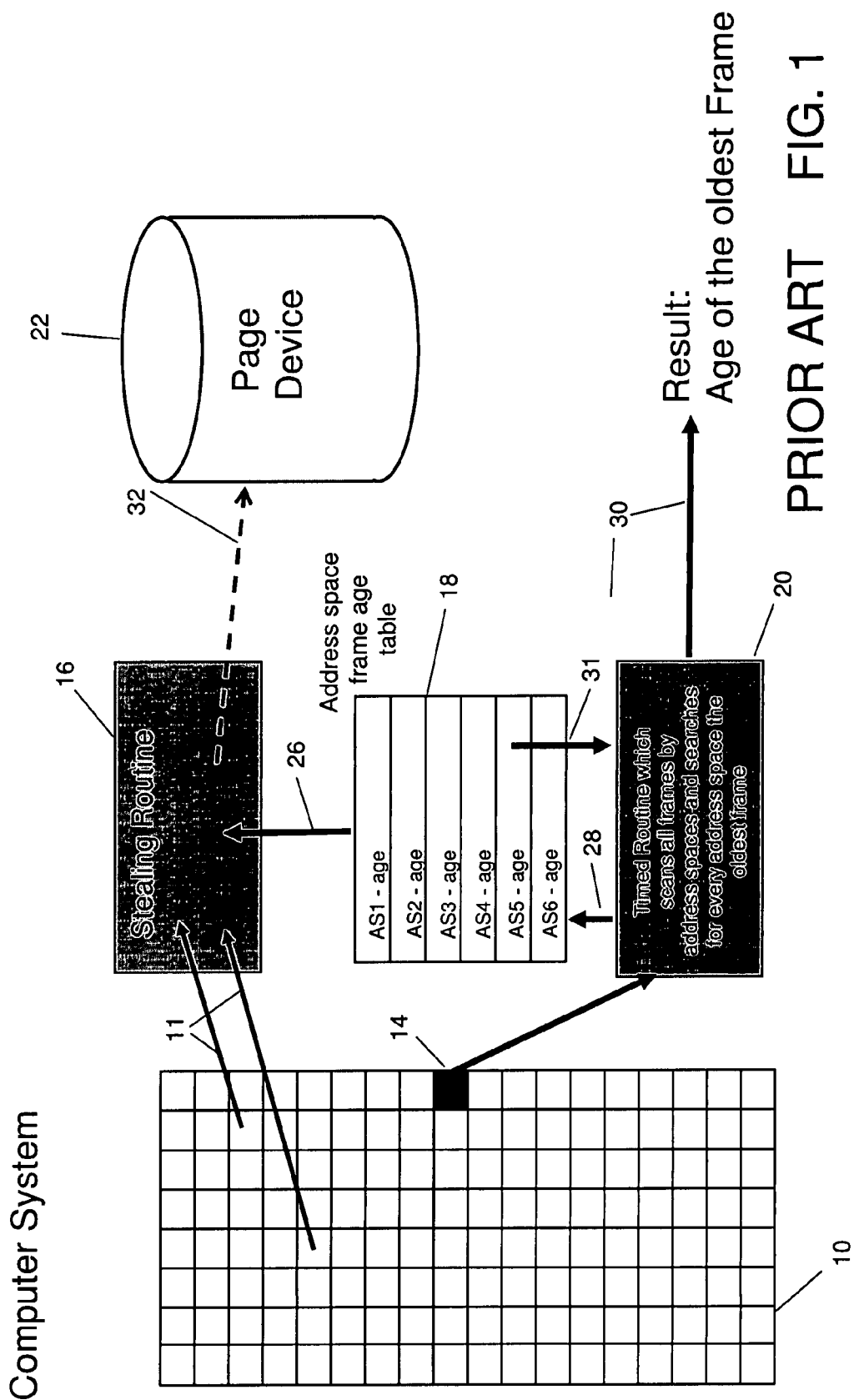
FIG. 1 illustrates the most basic structural components of a prior art memory system environment used for a prior art method.

In more detail, at step 320 the stealing routine (clock page replacement algorithm) tests a control signal that is ON when more frames are needed by the system in order to process a current peak load in memory usage. If YES, the stealing routine checks if the reference bit of a frame is set or not, see decision 325. If the reference bit is OFF, see the NO branch of 325, then this means that the respective frame is not used actually and the stealing routine writes the frame to the before-mentioned page device, see step 345, step 32 and page device 22 already shown in FIGS. 1 and 2.

In the YES branch of decision 325 the reference bit is found to be switched ON, thus indicating that the respective frame is actually used. In this case the reference bit is switched OFF in step 327, i.e. is reset, as this is the standard case based on the assumption that the current frame will not be used anymore when the frame is tested in the next stealing cycle.

Then in a decision 330 the prior art stealing routine (clock page replacement algorithm) is enriched by an additional test, checking if the current frame is the last frame in the current memory portion in process. As each frame has a number this check is done by a respective compare of frame numbers. In case of being the last frame of a portion (YES branch of decision 330) a next step 335 is performed, which updates the timestamps of table 38 for a respective current portions entry. This update procedure is further illustrated in FIG. 7, where for the first entry S1 the current timestamp is stored in the current timestamp field 64 (see back to FIG. 6 also), whereas the value which was stored in field 64 before is moved to field 66 in order to denote now the former current timestamp the previous timestamp, see step 72 and 74 in FIG. 7, also.

In the NO branch of decision 330 a pointer is set to the next frame of the main memory, see step 340, and the loop is reentered at decision 320 in order to ask, if further frames are needed. Thus, if after a given number of frames having been written to the page device according to step 345, when no more demand for further frames should exist, the prior art stealing routine (clock page replacement algorithm) just cycles around decision 320 without doing anything of steps 325, . . . , 345. Thus, as a person skilled in the art may appreciate, when such page stealer routine is called it cycles through the page frame table examining each frame's referenced bit. If the page is unreferenced and the page is not "pinned" for execution and meets other page-stealing criteria, the page is stolen and the frame is placed on the queue relevant for available frames. As referenced pages may not be stolen, and their reference bit is reset in the YES branch of decision 325, this setting of the bit effectively "ages" the reference so that the pages may be stolen the next time when the same page stealing algorithm cycles in the next memory loop. In particular, when decision 320 yields that there is no demand for new frames no stealing of frames occurs and a complete stealing cycle may take a long time, for example some days. In this case, a long stealing cycle is present which is used by the present invention in order to determine that no bottleneck in system memory usage is present.

The skilled reader appreciates that the calculation of the before mentioned metric system-high UIC takes place independently of the page replacement routine, identified by decision 325 and step 345 in FIG. 3.

Figure 8:
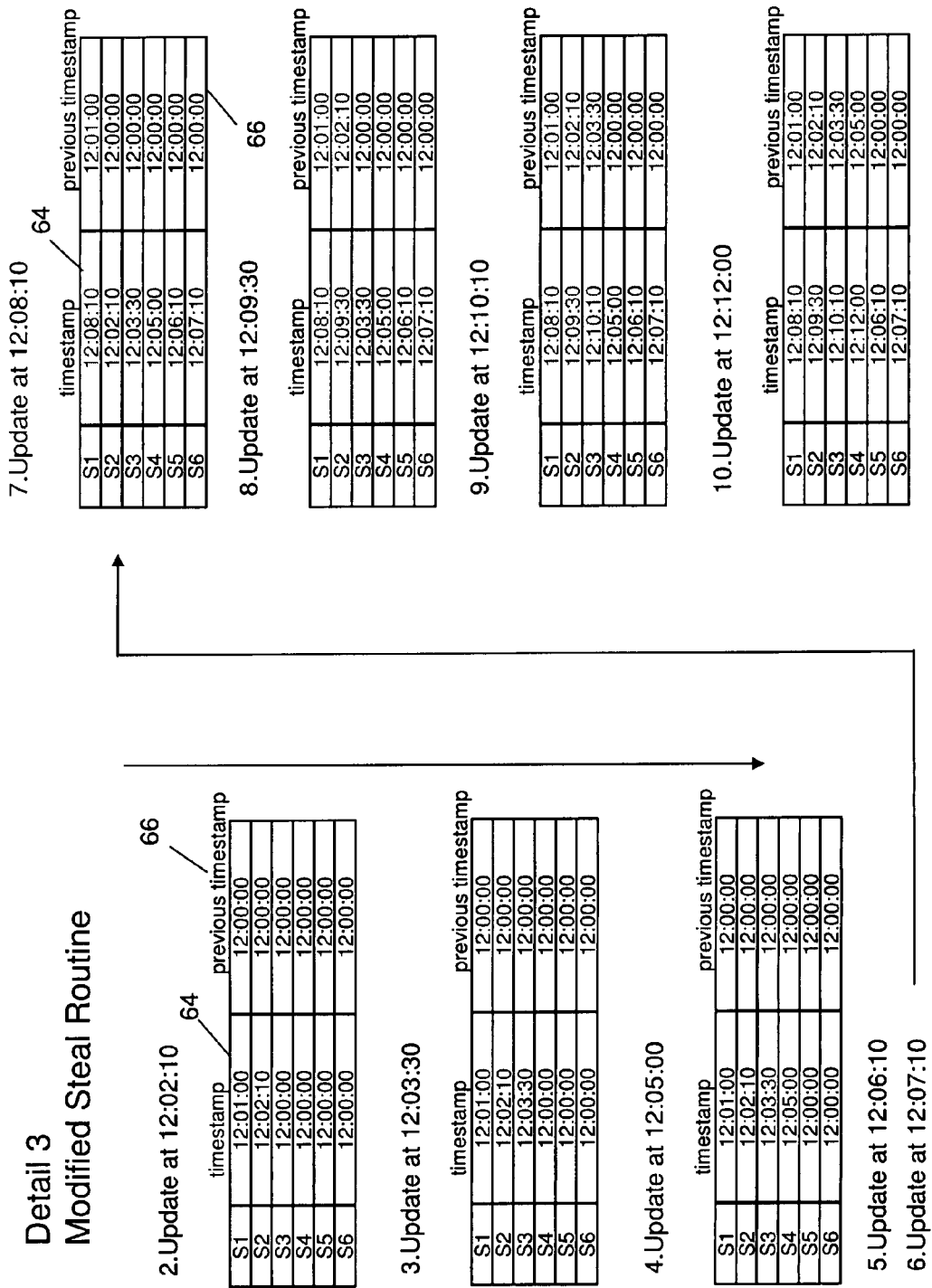

FIG. 8 shows an exemplary collection of a number of 10 update procedures, wherein each update procedure is performed by a complete run of the stealing routine (clock page replacement algorithm) covering a single memory portion 12. The system started at 12:00:00 and initialized all timestamp fields 64 and previous timestamp fields 66 with 12:00:00. Thus, the first update procedure is done at 12:01:00, as reveals from FIG. 7 and relates to portion 12A (see FIG. 5). The second update is done at 12:02:10 running through portion 12B, the third update is done at 12:03:30 on portion 12C, and so on as the times are depicted in FIG. 8. The particular representations of table 38 illustrate how the timestamp values on the current timestamp field 64 and the previous timestamp field 66 develop in the course of time.

Figure 4:
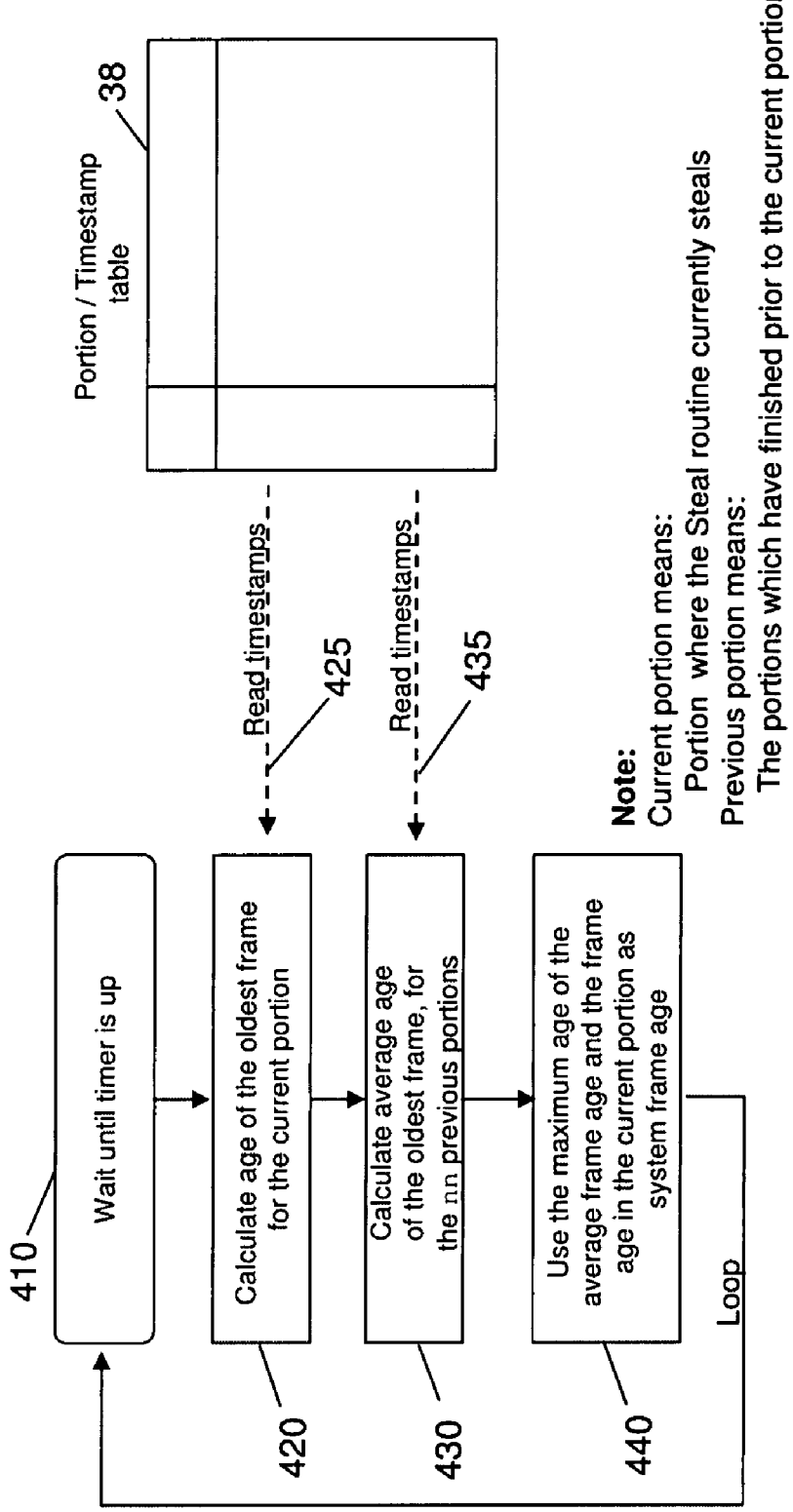
FIG. 4 illustrates the control flow in an routine used by a preferred embodiment of the present invention for providing the desired performance metric from the frame age determination obtained from the method as illustrated in FIG. 3.
Figure 9:
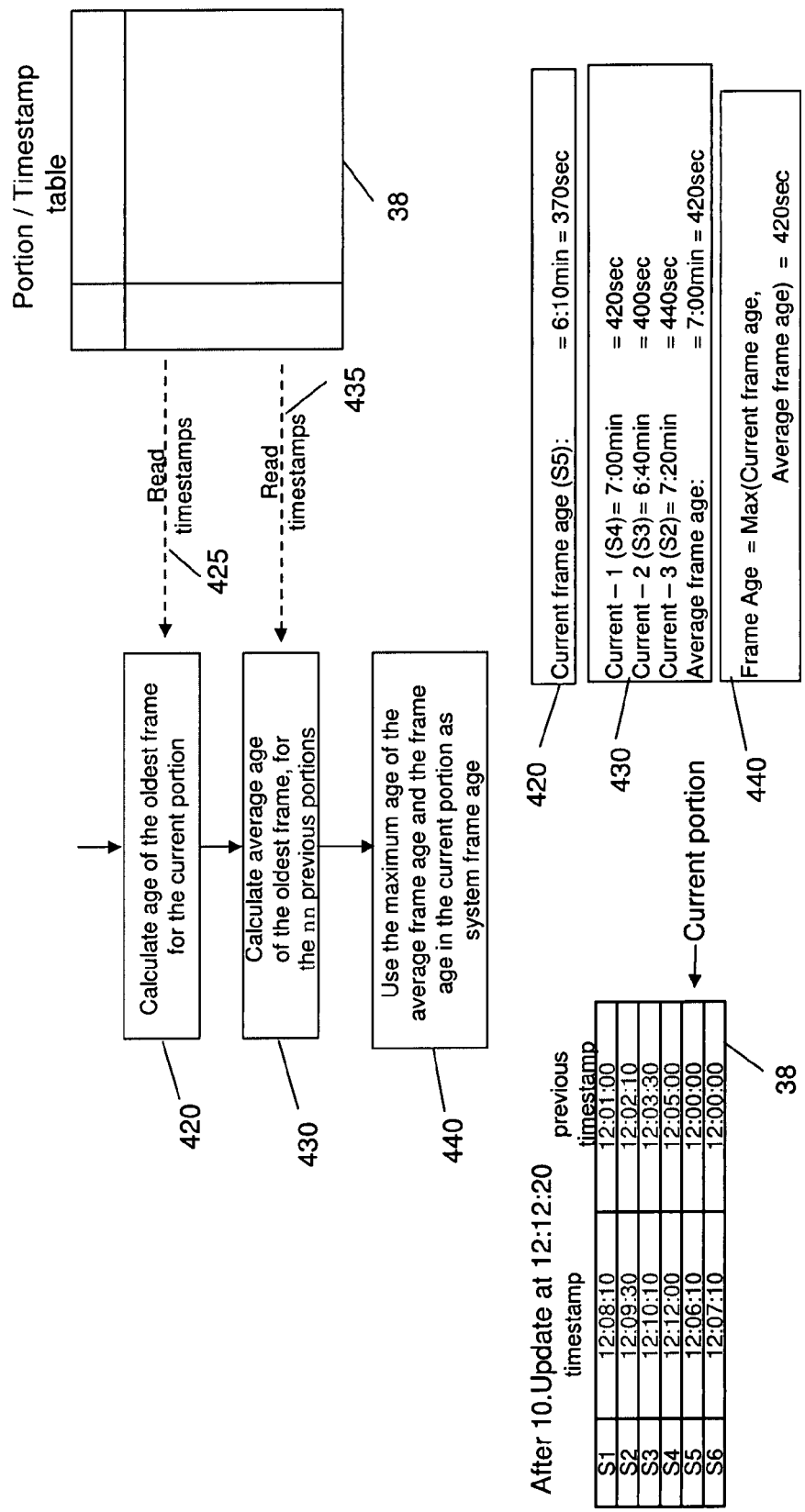
FIG. 9 is an overview over the frame evaluation according to this preferred embodiment, repeating parts of FIG. 4 in order to increase clarity.

With new reference to FIG. 9 the situation after the 10th update at 12:12:20, current time, is retaken into consideration. At this time an evaluation takes place according to this embodiment, evaluating if or if not a main memory performance bottleneck is present. The control flow of this evaluation is also depicted in FIG. 4. When a timer provided by external control logic signals in a first step 410 that the evaluation routine should start, then in a step 420 the age of the oldest frame for the current portion is calculated. In order to do that the timestamps stored in the provided timestamp table 38 are read, see step 425 in FIG. 4. The example shown in FIG. 9 calculates the current frame age of portion S5 as a difference of the current timestamp and previous timestamp stored for portions 5, which reveals in 6 minutes, 10 seconds or 370 seconds, see frame 420.

Then in a next step 430 according to this embodiment the average age of the oldest frame is calculated based on the current frame and the preceding nn previous portions. In this example the parameter nn is defined to be 3. Thus, for the current portion S5 the frame age of portions S4, S3 and S2 are calculated in the same way as done in step 420 for the current frame. As box 430 shows, the average frame age is in this case 420 seconds.

Then, in a step 440 the maximum is selected of the current frame age and the before calculated average frame age. In this case this is the maximum of (370 seconds, 420 seconds, yielding a frame age of 420 seconds). This frame age is used as a new definition of the before mentioned metric for determining and indicating performance problems in the computer system's main memory. As a person skilled in the art will appreciate, the frame age calculated in step 440 is actually the last cycle time for a complete stealing cycle, expressed in seconds.

The determination of the metric "frame age" according to the invention is then used according to prior art to determine the occurrence of a peak load, when this metric is below a predetermined threshold level. The selection of such a threshold needs to be done in test run and according to the functions which uses this target. For example, in z/OS a working set reduction of inactive address spaces starts at a threshold below a threshold value of 20.

If the frame age calculation of step 440 was based at a current frame age which is larger then the average frame age, the frame age literally corresponds to the last complete stealing cycle. If, however, the current frame age is smaller than the average frame age, the values of the preceding memory portions are weighted higher than the current portion. In this case the method of the present invention implements a kind of "inertia" parameter, which is usable to avoid instability of the determination result of the method.

There are some modifications of the algorithm possible. For example, the number of the before mentioned system constant can vary (exemplary value=16), or the number of previous portions can vary.

A change of the system constant to a higher value reduces the amount of frames in the portion and an exacter frame age calculation is possible. But this also increases the amount of system resources as a larger table and more CPU cycles are needed for the calculation.

An increase of the previous frames increases the time one looks back into the past, and this may not be the same as the system currently behaves. So it is necessary to set this value carefully and in relation to the total amount of portions.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

Permanent storage hardware resources mentioned herein, such as hard disk drives, or optical, or magneto-optical devices such as compact discs (CDs) or digital versatile disks (DVDs), flash ROM devices, are in general interchangeable in use, unless specified explicitly differently. So, for most storage purposes a permanent, non-volatile storage device such as mentioned before can be used, when the computer system in question has no special dedication or relation to be used as a hand-held or pocket-compliant system. Then of course in absence of a hard disk drive a flash ROM storage device is preferred. Volatile memory is generally used for temporarily storing programs or data, and in particular for loading programs or program submodules, and for the immediate data exchange with the central processing unit (CPU) of a computer.

The present invention can also be embedded in a computer program product, which comprises all the features enabling the implementation of the methods described herein, and which when loaded in a computer system is able to carry out these methods.

Computer program means or computer program in the present context mean any expression, in any language, code or notation, of a set of instructions intended to cause a system having an information processing capability to perform a particular function either directly or after either or both of the following: (a) conversion to another language, code or notation; (b) reproduction in a different material form.

What is claimed is:

1. A method for automatically determining performance problems in a computer system including a memory system due to a metric indicating a current memory peak load in the computer system, the memory system being divided into portions and each portion including a plurality of subunits, characterized by the step of using a cyclic stealing algorithm for stealing memory portions if the portions were not referenced since a last cycle and writing the portions to a secondary memory device, with an extension for determining an age of memory portions, wherein the extension comprises the steps of: writing time stamps to a data storage that identify only when a last subunit of a subselection of the memory portions was processed by the stealing algorithm, wherein a current time of a current cycle and a preceding current time of a preceding cycle different than the current cycle are stored in respective entries of the data storage, for generating age information for the memory subunits; and calculating the metric based on average age calculations including differences between a respective one of the current time and a respective one of the preceding current time of one or more of the entries of the data storage.

2. The method according to claim 1, wherein the extension further comprises the step of:
    determining an occurrence of a peak load when the metric is beyond a predetermined threshold level.

3. The method according to claim 1, wherein the step of calculating the metric includes averaging over at least three entries of the data storage.

4. The method according to claim 1, wherein the step of calculating the metric includes calculating a maximum value of a group of a current subunit age and a calculated average subunit age.

5. The method according to claim 1, wherein the memory portions are logically defined to refer to adjacent main memory area.

6. A computer program product for automatically determining performance problems in a computer system including a memory system due to a metric indicating a current memory peak load in the computer system, the memory system being divided into portions and each portion including a plurality of subunits, the computer program product being stored on a computer usable medium comprising computer readable program means including a functional component for causing a computer to perform the step of performing a cyclic stealing algorithm for stealing memory portions if the portions were not referenced since a last cycle and writing the portions to a secondary memory device, with an extension for determining an age of memory portions, wherein the extension comprises the steps of: writing time stamps to a data storage that identify only when a last subunit of a subselection of the memory portions was processed by the stealing algorithm, wherein a current time of a current cycle and a preceding current time of a preceding cycle different than the current cycle are stored in respective entries of the data storage, for generating age information for the memory subunits; calculating the metric based on average age calculations including differences between a respective one of the current time and a respective one of the preceding current time of one or more of the entries of the data storage; and determining an occurrence of a peak load when the metric is beyond a predetermined threshold level.

7. The computer program product according to claim 6, wherein the step of calculating the metric includes averaging over at least three entries of the data storage.

8. The computer program product according to claim 6, wherein the step of calculating the metric includes calculating a maximum value of a group of a current portion age and a calculated average subunit age.

9. The computer program product according to claim 6, wherein the memory portions are logically defined to refer to adjacent main memory area.

* * * * *